(12) United States Patent  (10) Patent No.: US 8,403,309 B2
Kamei                      (45) Date of Patent:    Mar. 26, 2013

(54) VIBRATION ISOLATING APPARATUS

(75) Inventor: Naoyuki Kamei, Yokohama (JP)

(73) Assignees: Bridgestone Corporation, Tokyo (JP); Honda Motor Co., Ltd., Tokyo (JP)

( * ) Notice: Subject to any disclaimer, the term of this patent is extended or adjusted under 35 U.S.C. 154(b) by 289 days.

(21) Appl. No.: 10/570,600

(22) PCT Filed: Sep. 6, 2004

(86) PCT No.: PCT/JP2004/012936
§ 371 (c)(1),
(2), (4) Date: Jul. 12, 2006

(87) PCT Pub. No.: WO2005/023574
PCT Pub. Date: Mar. 17, 2005

(65) Prior Publication Data
US 2007/0018367 A1    Jan. 25, 2007

(30) Foreign Application Priority Data
Sep. 5, 2003 (JP) .................... 2003-313481

(51) Int. Cl.
F16F 7/00   (2006.01)
F16M 3/00   (2006.01)
(52) U.S. Cl. .................. 267/141; 267/140.2
(58) Field of Classification Search .......... 267/141, 267/141.1, 141.2, 140.12, 140.2, 140.3, 140.4; 403/384; 248/560, 638
See application file for complete search history.

(56) References Cited

U.S. PATENT DOCUMENTS

| 4,697,795 | A | 10/1987 | West |
| 4,779,834 | A | 10/1988 | Bittner |
| 6,113,058 | A * | 9/2000 | Iwasaki ............... 248/678 |
| 6,457,380 | B1 * | 10/2002 | Aazizou et al. ........ 74/579 E |
| 6,571,664 | B2 | 6/2003 | Tadano et al. |
| 2005/0206057 | A1 * | 9/2005 | Endo ................... 267/292 |

FOREIGN PATENT DOCUMENTS

| EP | 0192380 A | 8/1986 |
| EP | 1054173 A1 | 11/2000 |
| EP | 1215068 A1 | 6/2002 |
| JP | 57-179523 U | 11/1982 |

(Continued)

OTHER PUBLICATIONS

Machine Translation of JP-08233030-A.*

*Primary Examiner* — Melody Burch
(74) *Attorney, Agent, or Firm* — Carrier Blackman & Associates, P.C.; William D. Blackman; Joseph P. Carrier

(57) ABSTRACT

A vibration isolating apparatus is provided in which a vehicle collision is detected as soon as a predetermined load or greater is applied to a torque rod, a rod portion of the vibration isolating apparatus for supporting an engine is broken, and the engine can be fallen down (moved) in a predetermined direction, whereby a passenger can be assured of safety at the time of the vehicle collision.

A vibration isolating apparatus includes a pair of rings, a rod portion connecting the pair of rings, the pair of rings and the rod portion being integrally formed from a resin or metal material, and inner cylinders which are inserted into the pair of rings, respectively, through rubber elastic bodies, wherein the rod portion is formed in an asymmetrical shape with respect to the pair of rings to provide rigidity difference, and the rod portion at the side having low rigidity is broken when a predetermined load or greater is applied thereto.

9 Claims, 3 Drawing Sheets

FOREIGN PATENT DOCUMENTS

| | | |
|---|---|---|
| JP | 61-110427 U | 7/1986 |
| JP | 60-85543 | 12/1986 |
| JP | 61-200723 | 12/1986 |
| JP | 61-200723 U | 12/1986 |
| JP | 08233030 A * | 9/1996 |
| JP | 2802404 B2 | 7/1998 |
| JP | 11-270607 | 10/1999 |
| JP | 11-278071 A | 10/1999 |
| JP | 2002-301743 | 10/2002 |
| JP | 3381493 B2 | 12/2002 |
| JP | 2003-206991 A | 7/2006 |

* cited by examiner

F I G. 5
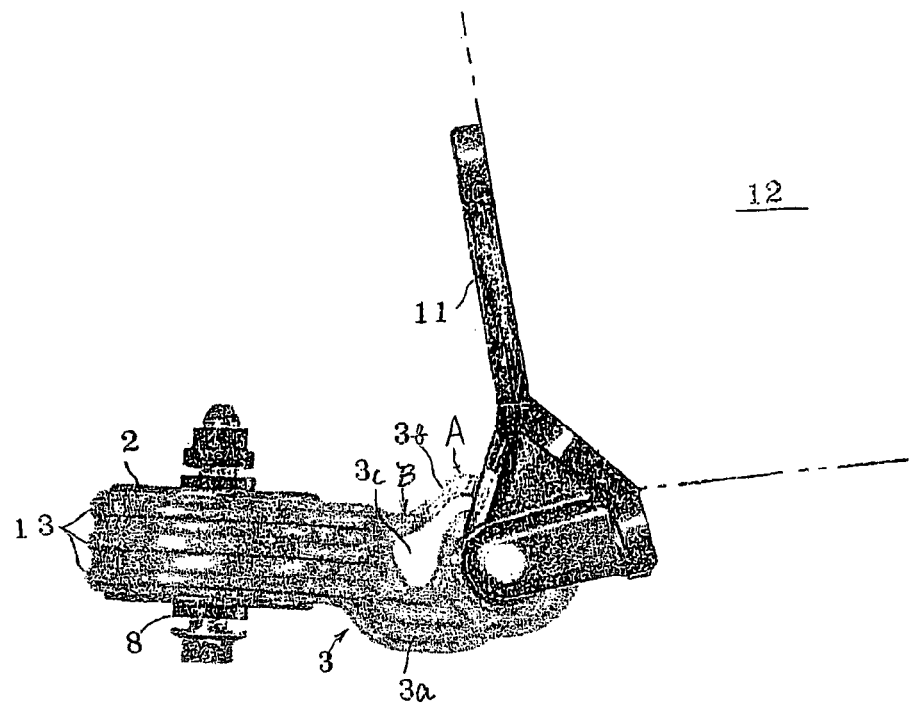
F I G. 6
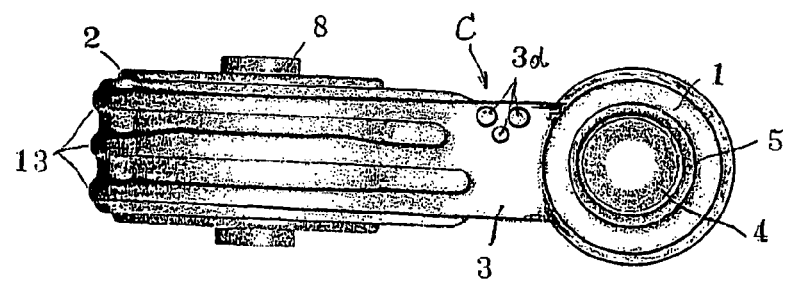

VIBRATION ISOLATING APPARATUS

TECHNICAL FIELD

The present invention relates to a vibration isolating apparatus for a vehicle. More particularly, the present invention relates to a new structure of a vibration isolating apparatus for supporting an engine and reducing vibration due to the engine.

BACKGROUND ART

As a vibration isolating apparatus for supporting an engine of a vehicle and reducing vibration due to the engine, torque rod bushes are widely used. Torque rod bushes, which are formed in various configurations or formed by various materials in accordance with the space of an engine room or the size of the engine, have been developed. Conventional objects of such vibration isolating apparatuses are to provide a function of reducing vibration due to an engine, and are mainly focused on the enhancement in effectiveness and operability when the engine is mounted within a narrow space.

FIG. 1 is a front view illustrating an example of such a vibration isolating apparatus (torque rod bush) which has been widely used in a prior art, and FIG. 2 shows a side view thereof. In this example, a pair of rings 21 and 22 is provided so as to form an angle of 90° therebetween. A cylinder 23 is inserted into the ring 21 (at the vehicle engine side), together with a bush 24. Stoppers 25 and 25 are disposed at both left-hand and right-hand sides of the ring 22 (at the vehicle body side). A cylinder 26 is supported by a pair of rubber elastic bodies 27 and 28, and inserted into the ring 22. Further, the rings 21 and 22 are connected by a rod portion 29, which is formed by a 6,6 nylon resin, for example. Ordinarily, the rod portion 29 is designed symmetrical at both sides so as to receive the stress applied thereto by its entire body as evenly as possible.

DISCLOSURE OF THE INVENTION

Problems to be Solved by the Invention

On the other hand, in recent years when the frequency of vehicle collision accidents is increased, various actions have been taken in order to assure a passenger of safety. As one of such safety measures, an idea in which an engine is prevented from moving in the direction of a passenger at the time of a vehicle collision has been thought of. For example, a method is considered in which an engine is prevented from continuously moving in the direction of a passenger in the event of the vehicle collision by deliberately allowing the engine to fall down (to the road surface side) while staying away from the passenger thus making it possible to assure a passenger of safety.

As the method of allowing an engine to fall down at the time of a vehicle collision, i.e., when a predetermined load or greater is applied to the engine, as a method of making the engine fall down, it can be considered that a member for supporting the engine is made by one which is broken when a predetermined load or greater is applied thereto. However, since the aforementioned vibration isolating apparatus is structured so as to receive a load by its entire body, it has been difficult to structure the apparatus so as to be broken easily whenever a predetermined load or greater is applied thereto.

The present inventors have studied intensively in order to meet such needs as described above. As a result, it became possible to provide a vibration isolating apparatus which can attain the above-described objects. The present invention provides a vibration isolating apparatus in which a predetermined region of the torque rod is configured to be broken whenever a predetermined load or greater is applied thereto thus making it possible to control the engine to fall down.

Means for Solving the Problems

In order to solve the aforementioned facts, the summary of the present invention is to provide a vibration isolating apparatus including a pair of rings, a rod portion connecting the pair of rings, the pair of rings and the rod portion being integrally formed from a resin or metal material, and inner cylinders which are inserted into the pair of rings, respectively, through rubber elastic bodies, wherein the rod portion is formed in an asymmetrical shape with respect to the pair of rings to provide rigidity difference, and the rod portion at the side having low rigidity is broken when a predetermined load or greater is applied thereto. In a specific example of the vibration isolating apparatus, the rod portion is forked into plural branch portions with respect to a central portion between the pair of rings, and a region on which a load concentrates is formed at at least one of the plural branch portions.

Effects of the Invention

The present invention is a vibration isolating apparatus structured as described above. A vehicle collision is detected as soon as a torque having a predetermined load or greater is inputted to the torque rod. The rod portion of the vibration isolating apparatus for supporting the engine is broken. Therefore, the engine can fall down (move) in a predetermined direction. Consequently, it becomes possible to assure a passenger of safety in the event of a vehicle collision.

BRIEF DESCRIPTION OF THE DRAWINGS

FIG. 5 is a view illustrating a state when the vibration isolating apparatus of FIG. 3 is mounted to a vehicle; and FIG. 6 is a front view of a vibration isolating apparatus (torque rod bush) according to a second embodiment of the present invention.

BEST MODE FOR CARRYING OUT THE INVENTION

Figure 1:
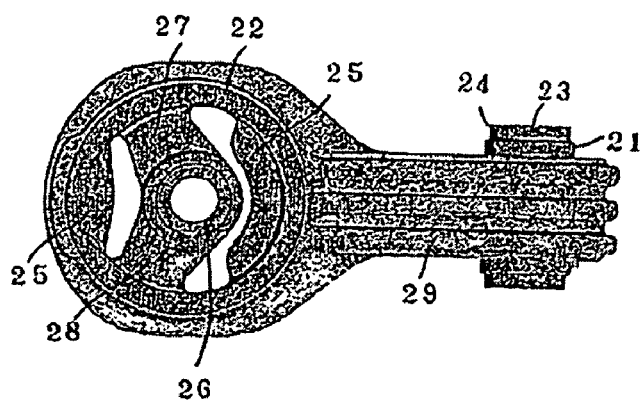
FIG. 1 is a front view showing a conventional vibration isolating apparatus (torque rod bush)
Figure 2:
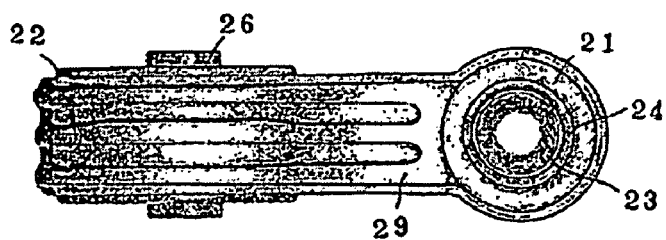
FIG. 2 is a side view of the vibration isolating apparatus in FIG. 1.

In a conventional vibration isolating apparatus as shown in FIGS. 1 and 2, generally, a rod portion has been designed symmetrical to connect a pair of the rings. Therefore, when the rod portion is to be broken upon a receipt of an input of a high load, it has been unpredictable which portion of the rod portion would be broken. Accordingly, with the symmetrical design of the rod portion unchanged, it has been difficult to provide a vibration isolating apparatus which is broken whenever a predetermined load or greater is applied thereto.

Among such vibration isolating apparatuses, the present invention provides a vibration isolating apparatus in which a portion, on which a load tend to concentrate, is artificially formed in advance thus making it possible to control an engine to fall down (move) upon a receipt of a high load at the time of a vehicle collision.

In other words, the vibration isolating apparatus for supporting an engine is structured such that specified portions along the rod are broken at the time of a vehicle collision. From a characteristic point of view, the vibration isolating apparatus is designed such that the rod portion connecting the rings is forked into two branch portions or more in such a way that individual branch portions having different rigidities. The rod portion can resist a load applied thereto at the time of an ordinary vehicle traveling. However, the rod portion at a side having small rigidity is broken when a high load is applied to the rod portion such as at the time of a vehicle collision. Further, in accordance with another embodiment of the present invention, the rod portion is designed asymmetric so as to provide a stress difference for the rod portion connecting the rings. For example, the rod portion can be formed by different materials having rigidity difference. Alternatively, the rod portion can be formed by the same material with breakage-prone portions being formed thereon by forming recessed portions at a specified portion(s) of the material or by making the material thinner.

Typical examples of materials for forming the rod portion of the present invention include a resin material such as a 6,6 nylon, a metal material such as aluminum, and the like. It is needless to say that plural different materials can provide the rod portion with rigidity difference.

Further, if the rod portion connecting the pair of rings is displaced from the center between the pair of the rings, rigidity difference is imparted therebetween. However, in this case, the position of gravity center is changed to thereby adversely affect its resonance. Further, in this case, a material having higher rigidity must be used for the vibration isolating apparatus in order to resist a load even at the time of the ordinary vehicle traveling. Consequently, the structure cannot be the best mode for carrying out the invention.

Thus, the vibration isolating apparatus according to the present invention is designed to be broken when a predetermined load or greater is inputted to the rod portion thereof, thus making it possible to control a load imparted to the engine.

[Embodiments]

Hereinafter, with reference to the drawings, the vibration isolating apparatus of the present invention will be explained in more detail.

Figure 3:
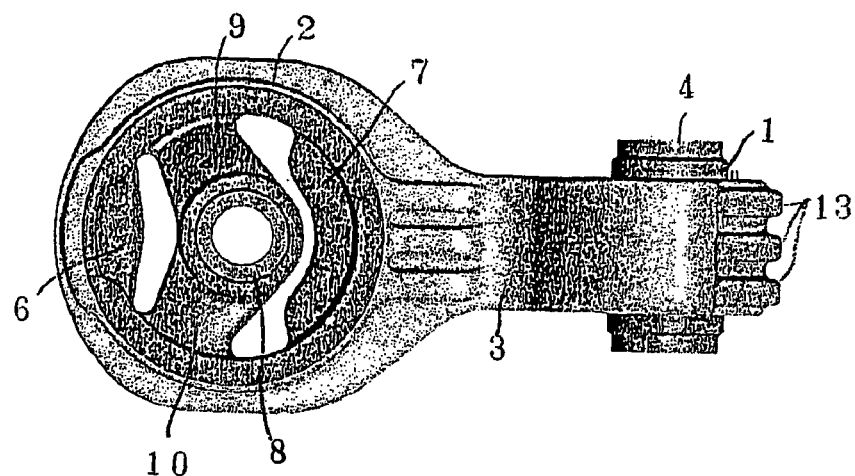
FIG. 3 is a front view showing a vibration isolating apparatus (torque rod bush) according to a first embodiment of the present invention.
Figure 4:
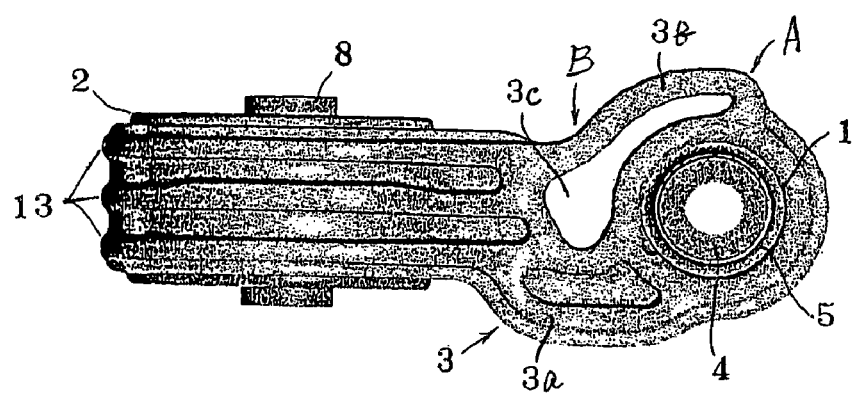
FIG. 4 is a side view of the vibration isolating apparatus in FIG. 3.

FIG. 3 shows a front view of a vibration isolating apparatus (torque rod bush) according to a first embodiment of the present invention, FIG. 4 shows a side view thereof, and FIG. 5 shows a view showing a state in which the vibration isolating apparatus is attached to a vehicle. Reference numerals 1 and 2 denote a pair of first and second rings, respectively, and their directions are separated from each other at an angle of 90 degrees. A reference numeral 3 denotes a rod portion connecting the rings 1 and 2. The ring portions 1 and 2, and the rod portion 3 are formed by a 6,6 nylon to be integrated with one another. A cylinder 4 is inserted into one ring 1 (at the vehicle engine side) in a state in which the circumference of the cylinder 4 is surrounded by a rubber bush 5. A pair of rubber stoppers 6 and 7 is disposed at the other ring 2 (at the vehicle body side), and a cylinder 8 is disposed at the other ring 2 as well in a state of being supported by a pair of rubber elastic bodies 9 and 10 which are disposed to incline. A reference numeral 11 (FIG. 5) denotes a mounting plate of an engine 12. Further, ribs 13 are formed at the rings 1, 2 and the rod portion 3 to increase the strength of the apparatus and enhance the formability by making the entire thickness uniform as much as possible.

In this embodiment, the rod portion 3, which is formed by a 6,6 nylon, branches outwardly from a connection part, which is shown to the left of a cavity 3c in FIG. 4. As seen in the drawing, the rod portion 3 is vertically forked into two branch portions 3a and 3b which diverge outwardly from a connection part situated substantially at the center thereof with respect to the ring 1 to form the cavity 3c at a central portion of the rod portion 3. In other words, the rod portion 3 is formed in an asymmetrical branched shape including a connection part, the upper branch portion 3b and the lower branch portion 3a. The branch portions 3a, 3b diverge outwardly away from the connection part to the first ring 1 which supports the vehicle engine. The cavity 3c extends through the rod portion, so that the non-attached areas of the branch portions 3a, 3b are substantially independent of one another. In the depicted embodiment, the upper branch portion 3b extends upwardly to an area A above the first ring 1, where it then turns, extends downwardly and integrally joins the ring. Further, the lower branch portion 3a is larger and the upper branch portion 3b is narrower, and the cavity 3c is formed so as to be extended in the vicinity of the tip end of the upper branch portion 3b. More specifically, the open cavity 3c is formed in an asymmetric shape in relation to a plane bisecting the rod portion between the first and second rings 1, 2 such that the upper branch portion 3b is narrower than the lower branch portion 3a. The rod portion 3 is forked into the two branch portions 3a and 3b with respect to the pair of rings 1 and 2, and formed in an asymmetrical shape to provide the rod portion 3 with a rigidity difference. As shown in the figures, an asymmetry (i.e., the asymmetrical shape) is formed with respect to a plane which passes through a central portion of the second ring 2 transverse to the central axis thereof, and which bisects the first ring 1 about its central axis.

For this reason, the two branch portions 3a and 3b of the rod portion can resist a load applied thereto at the time of an ordinary vehicle traveling. However, when a high load (a load at the time of a vehicle collision) is applied to the rod portion 3, stress is concentrated on a region A at the branch portion 3b side of the rod portion 3, and breakage occurs from this region. Then, a region B is broken. A value for the strength of the region A can be specified in advance. As a result, the engine can reliably fall down at the time of the vehicle collision thus making it possible to assure a passenger of safety.

According to the aforementioned embodiment, the rod portion 3a and 3b can be formed in an arbitrary configuration. Although the cavity 3c is formed, this region can be thinned into a film state or made thinner until it is extended to the branch portion 3b to provide the rod portion 3 with a rigidity difference. Further, although the rod portion can be formed merely by the branch portion 3a, in this case, the branch portion 3a is formed originally being offset from the center of the rings 1 and 2. Further, only the branch portion 3a must receive a load applied thereto at the time of an ordinary vehicle travelling, whereby the branch portion 3a at the offset side of the rod portion 3 requires an extremely high strength.

FIG. 6 is a side view illustrating a second embodiment of the present invention. Holes (or recesses) 3d are formed at the rod portion 3 to provide the rod portion 3 at both left-hand and right-hand sides with a rigidity difference. Accordingly, the holes 3d can be the center of a breakage portion C. Further, although it is not shown, the center of the breakage portion can be formed due to the region corresponding the holes 3d as a whole being recessed toward the center thereof.

INDUSTRIAL APPLICABILITY

In accordance with the vibration isolating apparatus of the present invention, the rod portion is broken upon a receipt of a predetermined load or greater thereby allowing an engine, for example, which is supported by the vibration isolating apparatus to fall down. It is needless to say that this structure is applicable to various types of vehicles. Furthermore, the present invention can be used for a vibration isolating mount, and is applicable at the time when earthquakes occur. Consequently, the industrial value is quite high.

DESCRIPTION OF THE REFERENCE NUMERALS 1, 2: rings
3, 3a, and 3b: rod portions
3c: cavity
3d: hole
4, 8: cylinders
5: rubber bush
6, 7: stoppers
9, 10: rubber elastic bodies
11: plate
A, B and C: breakage portions of the rod

The invention claimed is:

1. A vibration isolating apparatus for supporting a vehicle engine, said apparatus comprising:
a first ring and a second ring each having a respective central axis;
a rod portion connecting the first and second rings, the first and second rings and the rod portion being integrally formed from a resin or metal material; and
inner cylinders which are inserted into the first and second rings, respectively, through rubber elastic bodies;
wherein the rod portion is formed in an asymmetrical branched shape comprising a connection part, an upper branch portion and a lower branch portion, the lower branch portion extending in a downward direction from the connection part and being connected to the first ring, said branch portions diverging outwardly away from the connection part to the first ring which supports the vehicle engine,
wherein the branch portions have an open cavity formed therebetween with respect to a central portion between the first and second rings, the open cavity being a through cavity and extending to a vicinity of a tip end of the upper branch portion; the open cavity being formed in an asymetric shape in relation to a plane bisecting the rod portion between the first and second rings such that the upper branch portion is narrower than the lower branch portion; the upper branch portion being connected to the first ring at an upper side of the first ring, wherein the upper branch portion terminates at the upper side of the first ring;
wherein the cavity exclusively originates at said central portion between the first and second rings in an up-down direction of the rod portion, and extends from said central portion in an upward direction to the vicinity of the tip end of the upper branch portion and reaches an upper portion of the first ring;
wherein the first ring connects to the vehicle engine and the second ring connects to a body of a vehicle;
wherein the upper and lower branch portions are configured differently from one another to provide a rigidity difference therebetween, and the rod portion at the side having low rigidity is configured to break when a predetermined load or greater is applied thereto to allow the vehicle engine to move in a predetermined direction; and
wherein the upper branch portion has a lower rigidity than a rigidity of the lower branch portion.

2. The vibration isolating apparatus according to claim 1, wherein the rod portion is forked into plural branch portions comprising said upper and lower branch portions with respect to said central portion between the first and second rings, and a region on which a load of the vehicle engine concentrates is formed at at least one of the plural branch portions.

3. The vibration isolating apparatus according to claim 2, wherein the upper branch portion extends upwardly to an area above the first ring.

4. The vibration isolating apparatus according to claim 2, wherein at least one of the branch portions of the rod portion is made thinner than an unbranched area of the rod portion.

5. The vibration isolating apparatus according to claim 1, wherein the rod portion has a plurality of ribs formed thereon.

6. A vibration isolating apparatus for supporting a vehicle engine on a vehicle body, said apparatus comprising:
a first ring configured to be operatively connected to the vehicle engine, and a second ring configured to be operatively connected to the vehicle body;
a rod portion connecting the first and second rings, the first and second rings and the rod portion being integrally formed from a resin or metal material;
first and second rubber elastic bodies which fit into the first and second rings, respectively; and
inner cylinders which are inserted into the first and second rings, respectively, through the rubber elastic bodies;
wherein the rod portion is formed in an asymmetrical branched shape comprising a connection part, an upper branch portion and a lower branch portion, the lower branch portion extending in a downward direction from the connection part and being connected to the first ring, said branch portions diverging outwardly away from the connection part to the first ring which supports the vehicle engine,
wherein the upper and lower branch portions are configured differently from one another to provide a rigidity difference therebetween, wherein the upper branch portion has a lower rigidity than a rigidity of the lower branch portion;
wherein the upper branch portion is thinner than the lower branch portion in order to provide a side having low rigidity which is configured to break before other parts of the apparatus when a load equal to or greater than a predetermined amount is applied thereto, to allow the vehicle engine to move in a predetermined direction;
wherein the branch portions have an open cavity formed therebetween at a central portion between the first and second rings, said open cavity being a through cavity and extending to a vicinity of a tip end of the upper branch portion; the open cavity being formed in an asymmetric shape in relation to a plane bisecting the rod portion between the first and second rings such that the upper branch portion is narrower than the lower branch portion; the upper branch portion being connected to the first ring at an upper side of the first ring, wherein the upper branch portion terminates at the upper side of the first ring; and a lower side end of the open cavity is formed at a portion of the rod portion lower than a central portion of the first ring;
wherein the cavity exclusively originates at said central portion between the first and second rings in an up-down direction of the rod portion, and extends from said central portion in an upward direction to the vicinity of the tip end of the upper branch portion and reaches an upper portion of the first ring;
wherein the first ring connects to the vehicle engine and the second ring connects to the vehicle body; and wherein a region where a load concentrates is formed on at least one of the branch portions; and wherein the upper branch portion extends upwardly to an area above the first ring.

7. The vibration isolating apparatus according to claim 6, wherein at least one of the branch portions of the rod portion is made thinner than an unbranched area of the rod portion.

8. The vibration isolating apparatus according to claim 6, wherein the rod portion has a plurality of ribs formed thereon.

9. A vibration isolating apparatus for supporting a vehicle engine, said apparatus comprising:
- a first ring and a second ring each having a respective central axis;
- a rod portion connecting the first and second rings, the first and second rings and the rod portion being integrally formed from a resin or metal material; and
- inner cylinders which are inserted into the first and second rings, respectively, through rubber elastic bodies;
- wherein the rod portion is formed in an asymmetrical branched shape comprising a connection part, an upper branch portion and a lower branch portion, said branch portions diverging outwardly away from the connection part to the first ring which supports the vehicle engine,
- wherein the branch portions have an open cavity formed therebetween with respect to a central portion between the first and second rings, the open cavity being a through cavity and extending to a vicinity of a tip end of the upper branch portion; the open cavity being formed in an asymmetric shape in relation to a plane bisecting the rod portion between the first and second rings such that the upper branch portion is narrower than the lower branch portion; the upper branch portion being connected to the first ring at an upper side of the first ring, wherein the upper branch portion terminates at the upper side of the first ring; and a lower side end of the open cavity is formed at a portion of the rod portion lower than a central portion of the first ring;
- wherein the cavity exclusively originates at said central portion between the first and second rings in an up-down direction of the rod portion, and extends from said central portion in an upward direction to the vicinity of the tip end of the upper branch portion and reaches an upper portion of the first ring;
- wherein the first ring connects to the vehicle engine and the second ring connects to a body of a vehicle;
- wherein a width of the open cavity at the second ring side is greater than a width of the open cavity at the first ring side;
- wherein the upper and lower branch portions are configured differently from one another to provide a rigidity difference therebetween, and the rod portion at the side having low rigidity is configured to break when a predetermined load or greater is applied thereto to allow the vehicle engine to move in a predetermined direction; and
- wherein the upper branch portion has a lower rigidity than a rigidity of the lower branch portion.

* * * * *